May 16, 1961  E. W. SIMONS  2,983,948
TONG HINGE MOUNTING FOR MIRRORS AND THE LIKE
Filed April 8, 1959  3 Sheets-Sheet 1
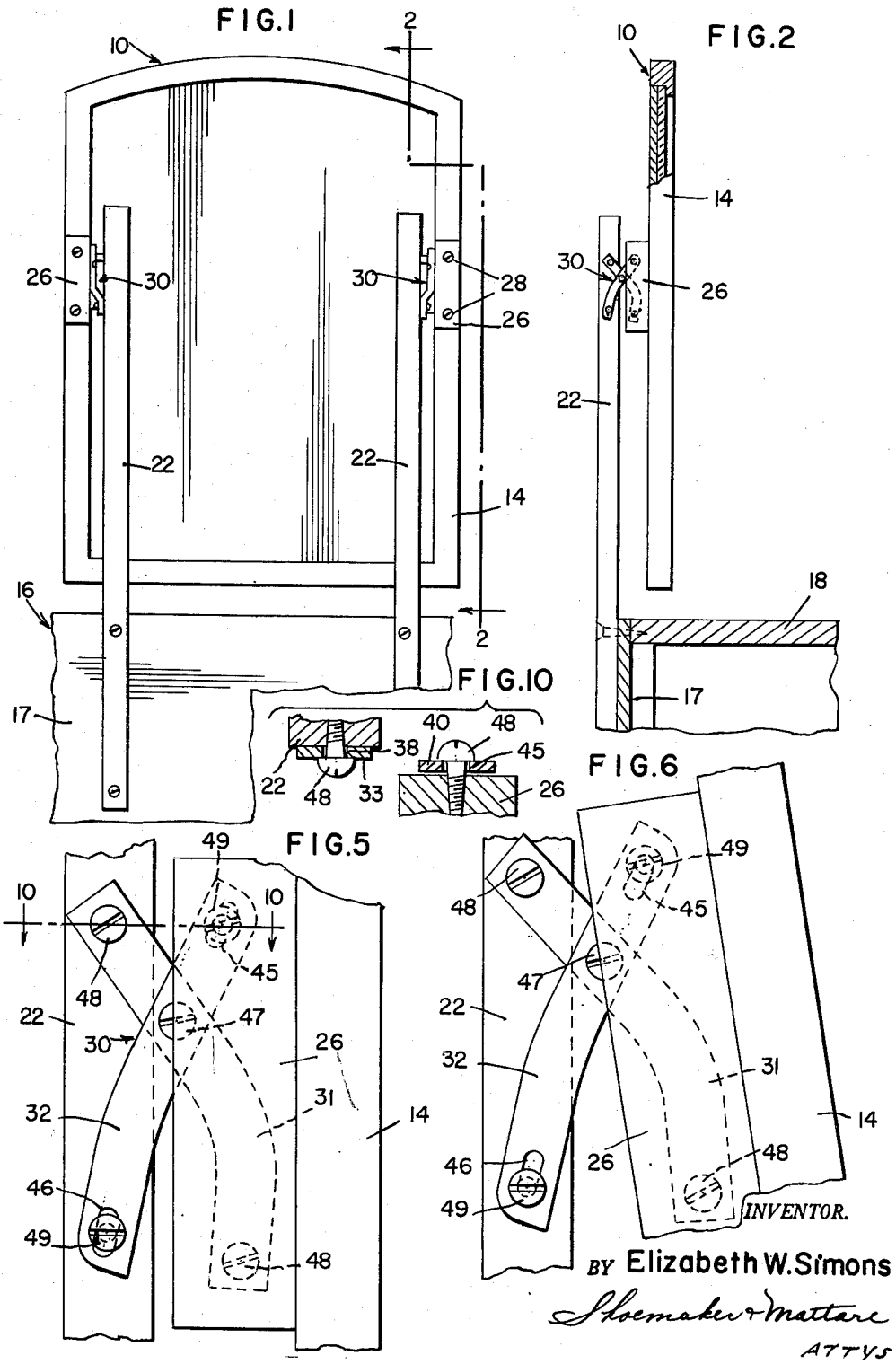
INVENTOR.
BY Elizabeth W. Simons
Shoemaker + Mattare
ATTYS

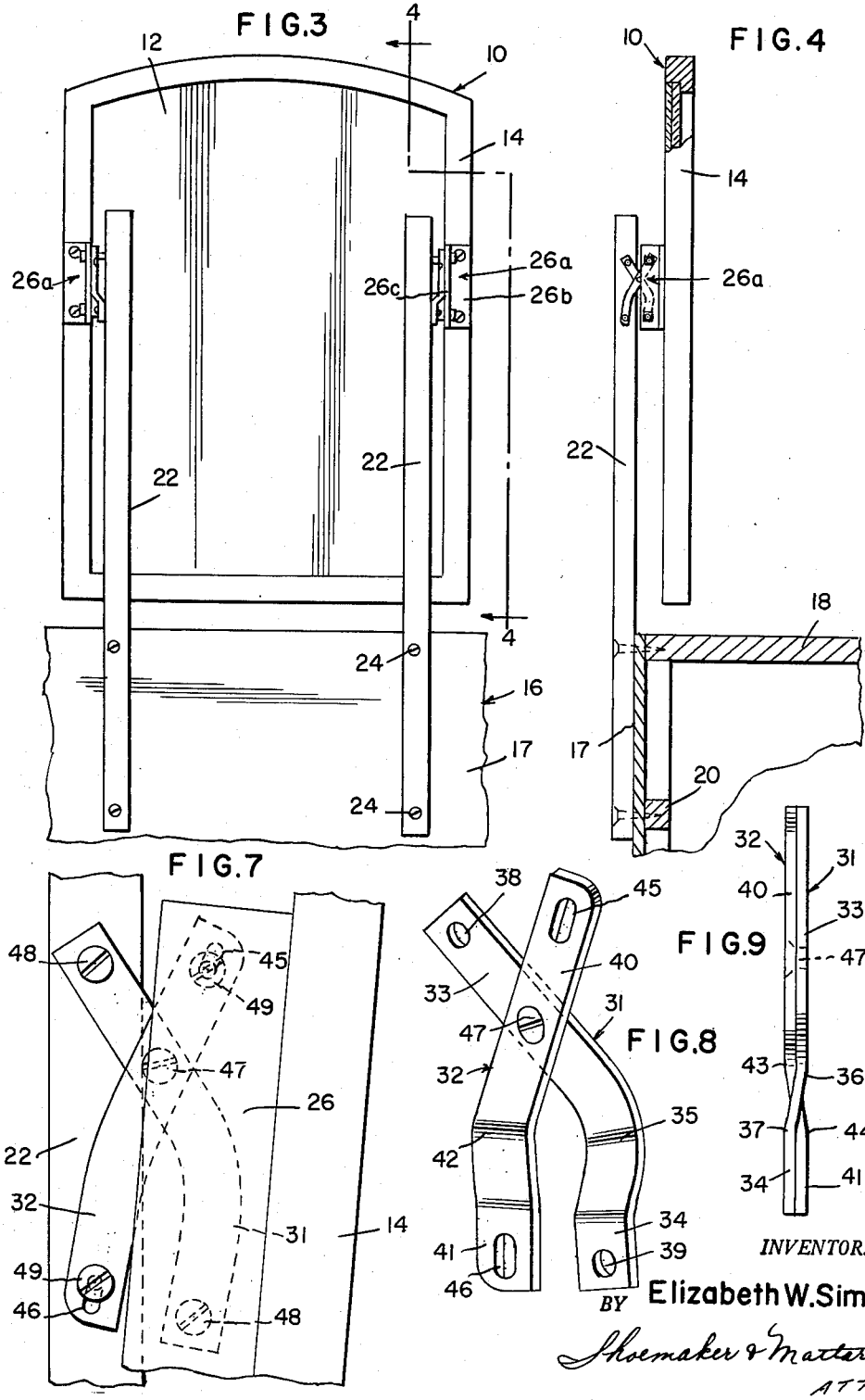

May 16, 1961     E. W. SIMONS     2,983,948
TONG HINGE MOUNTING FOR MIRRORS AND THE LIKE
Filed April 8, 1959     3 Sheets-Sheet 3
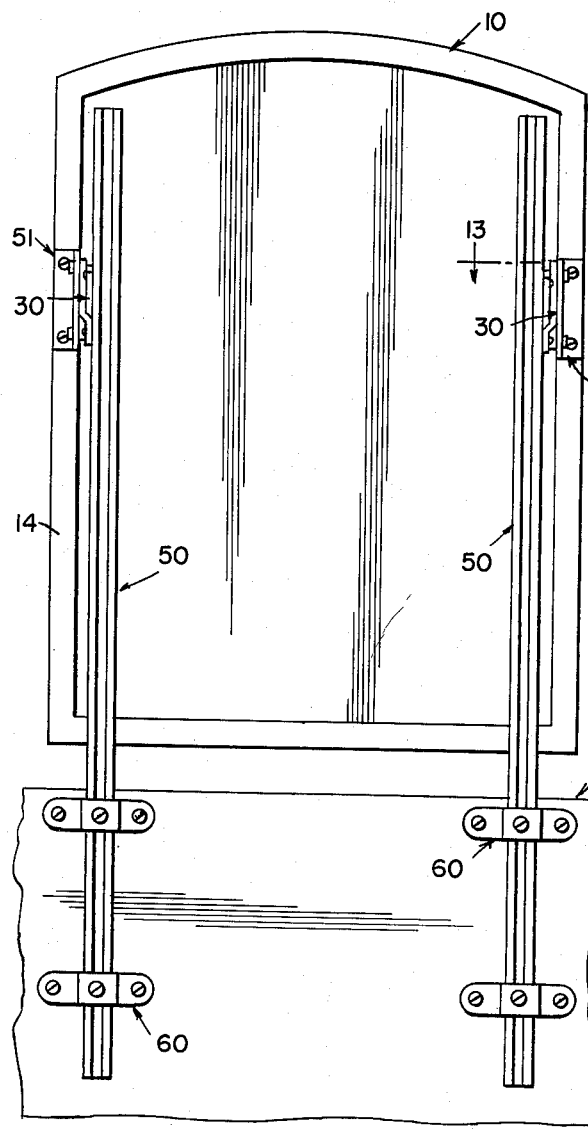
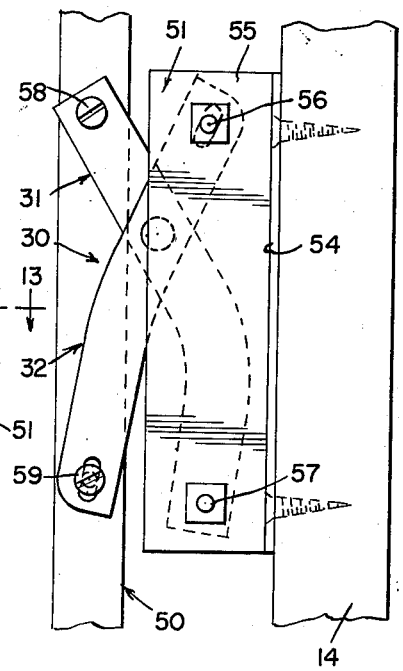
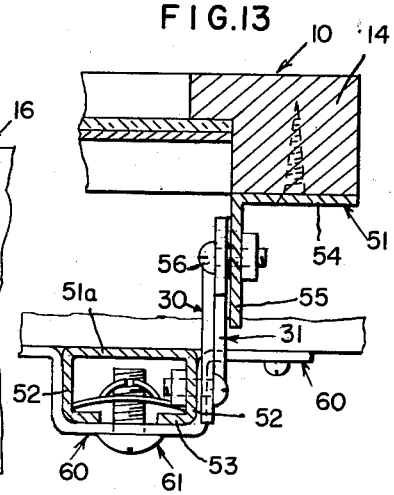
INVENTOR.
Elizabeth W. Simons
BY
Shoemaker & Mattare
ATTYS United States Patent Office 2,983,948
Patented May 16, 1961

2,983,948
TONG HINGE MOUNTING FOR MIRRORS AND THE LIKE
Elizabeth W. Simons, 3306 Rowan Road, Sedgefield, Greensboro, N.C.
Filed Apr. 8, 1959, Ser. No. 805,011
5 Claims. (Cl. 16—166)

This invention relates generally to hinge mountings or supports for mirrors and other framed structures.

Use of hinges or hinge devices of various kinds has been made heretofore for supporting structures or bodies of the nature of mirrors in such a manner as to facilitate the disposition of the mirror at different angles of inclination in addition to supporting the same in vertical position so that the use of the mirror by persons of different height can be conveniently made. These prior mounting devices frequently depend upon the use of tightening screws or locking elements to maintain the mirror in a desired inclined position and accordingly in order to move the mirror to the selected position the manual manipulation of screws or securing means of some other character is necessary, first, to loosen the hinge so as to permit placing the mirror in the desired position, and then to subsequently tighten the hinge to hold the mirror in the selected position of adjustment.

It is a particular object of the present invention to provide a new and novel form of hinge mounting for mirrors and the like whereby the desired adjustments of the supported mirror can be made without the necessity of making any manual adjustment of screws or other clamping or locking means.

It is another object of the invention to provide a mounting hinge of the character stated which is of extremely simple design but which will be strong and durable and economical to manufacture.

Still another object of the invention is to provide a new and novel mounting hinge of the character stated which by reason of a unique design of the hinge parts makes it possible to support the mirror upon mounting or supporting standards by the use of conventional wood screws or bolts and also makes possible the easy and quick swinging of the mirror to adjusted position merely by grasping the mirror at the bottom of the frame and pulling forward upon the same or pushing rearwardly thereon, the relationship of the uniquely designed parts of the hinge further being such that the mirror will be firmly held against reverse swinging movement from a tilted position in which it may have been set.

A still further object of the invention is to provide a mounting hinge having the above described advantages, which aside from the mounting screws or bolts is composed of only two elements pivotally coupled in crossed relation and wherein one of the elements is designed with elliptical slots through which the mounting screws or bolts extend and which permit the hinge action to take place upon the tilting of the mirror or other supported body and wherein further the cooperative relationship between the slotted member and the other member which is pivotally secured between the mirror frame and a supporting standard, is of such unique character that the weight of the supported mirror actually contributes toward the stability of the hinge and its action of remaining with its parts in the position in which it is set by the action of swinging the mirror.

The invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Fig. 1 is a view in rear elevation of a mirror showing hinges constructed in accordance with the present invention mounting the mirror upon supporting standards carried by a case, such as a bureau, chiffonier or the like;

Fig. 2 is a partial section and partial elevational view taken in the plane of line 2—2 of Fig. 1;

Fig. 3 is a view corresponding to Fig. 1 but showing the use of a different type of bracket member on the rear of the mirror frame to which the hinges are attached;

Fig. 4 is a view partially in section and partially in elevation taken in the plane of line 4—4 on Fig. 3;

Fig. 5 is a view on an enlarged scale showing in greater detail one of the hinges illustrated in Figs. 1 to 4, with the parts in the position assumed when the mirror is supported in vertical position;

Fig. 6 is a view corresponding to Fig. 5, but showing the parts of the hinge in the positions assumed when the mirror is tipped rearwardly;

Fig. 7 is a view corresponding to Figs. 5 and 6 and showing the position assumed by the parts of the hinge when the mirror is tipped forwardly;

Fig. 8 is a view in perspective of one hinge;

Fig. 9 is a view of the hinge in edge elevation;

Fig. 10 is a fragmentary sectional detail in which the section is taken substantially on the line 10—10 of Fig. 5;

Fig. 11 is a view in rear elevation of a mirror showing the employment of the hinge for mounting the same by means of angle bar brackets upon vertically adjustable metal standards secured for such vertical adjustment to the back of a case such as a bureau, chiffonier or the like;

Fig. 12 is a view in side elevation and on an enlarged scale of the manner of securing a hinge to the supporting bracket and metal supporting standard shown in Fig. 11;

Fig. 13 is a sectional view taken substantially on the line 13—13 of Fig. 11.

Referring now more particularly to the drawings, the numeral 10 generally designates in each of Figs. 1 to 4 a framed mirror wherein the back panel is designated 12 and the frame is designated 14 while the case above which the mirror is supported and which may be a bureau, chiffonier, dressing table or other article of furniture, is generally designated 16, the rear wall 17 of the case, of course, being shown in Figs. 1 and 3 while in Figs. 2 and 4 the top of the case is shown and designated 18 and there is also illustrated within the case and extending across the forward side of the back panel or back wall 17 a horizontal bar 20 forming a part of the case frame. These described portions of the case are all, of course, conventional.

The mirror structure 10 in the figures referred to is shown supported by the hereinafter described hinges upon standards which are designated 22 and which have the lower ends thereof positioned against the back wall or back panel 17 of the case 16 by means of screws 24 or the like which penetrate the top 18 and the bar 20 as shown particularly in Fig. 4.

The side uprights of the mirror frame 14 have fixed thereon, for one manner of supporting the mirror as illustrated in Figs. 1 and 2, a bracket 26 in the form of a wood block, the means of securing the block bracket to the frame being of any suitable character as, for example, the screws 28. The standards 22 are spaced apart the proper distance for them to be located between the brackets 26 with each standard in slightly spaced relation from the adjacent bracket and the novel hinge of the present invention is located between the inner side of each bracket 26 and the adjacent side of the standard 22.

The hinges connecting the brackets 26 with the adjacent standards are each designated 30 and since these hinges are, of course, of duplicate construction, except for the reversal of portions of the parts for right and left hand use, the description will be confined to one hinge only.

As will be seen upon reference to Fig. 8 in which the hinge structure is shown in perspective, the hinge comprises the two elongate bars 31 and 32 which may be further identified as the apertured bar, being the bar numbered 31, and the slotted bar, being the bar numbered 32. These bars are formed of flat strip metal of suitable weight and are arranged in crossed relation and pivotally coupled together as illustrated.

The bar 31 comprises a relatively long straight upper portion 33 joined to a short straight terminal lower portion 34 by a longitudinally curved intermediate portion 35. In addition to the longitudinal curvature of this intermediate portion, such portion has a compound transverse bowing or curvature or what might be described as an elongated transverse ogee curvature which is effected by means of the two reverse bows 36 and 37. Thus this longitudinally curved intermediate portion 35 crosses over the corresponding lower portion of the other hinge bar or the slotted hinge bar 32, about to be described. The upper end of the long straight portion 33 has a screw or bolt aperture 38 therein while the short straight lower portion has a similar screw or bolt aperture 39 therethrough.

The slotted hinge bar 32 likewise comprises a relatively long straight upper portion 40 and a short straight lower terminal portion 41 and this terminal portion is connected by the intermediate longitudinally curving portion 42.

The longitudinally curving portion 42 is formed in a similar manner to the portion 35 of the bar 31, that is, it has the two reversely curving bowed portions 43 and 44, thus giving to the longitudinally curved portion the reverse curvature or elongated ogee curvature shown in Fig. 9, thereby placing these two portions 35 and 42 in the crossed-over relation illustrated when the long upper portions 33 and 40 are disposed in the face to face contacting relation which will locate the lower portions 34 and 41 respectively in the planes of the upper portions 40 and 33.

As illustrated in Fig. 8 and other figures, the upper end of the long portion 40 and the lower short portion 41 have formed therethrough the longitudinally extending elongated slots 45 and 46 respectively.

The straight flat portions 33 and 40 of the bars 31 and 32 are crossed at points approximately midway of their lengths and are permanently connected together by a pivot pin or rivet 47. Thus this pivot connection between the two bars is located approximately one-third of the distance from the upper ends of the crossed bars so that the major length of the bars is below the pivot.

As best shown in Figs. 5, 6, 7 and 12, the upper end of the apertured bar 31 and the lower end of the slotted bar 32 are connected to the supporting standard and the upper end of the slotted bar 32 and the lower end of the apertured bar 31 are connected to the mirror frame through the medium of the coupling bracket. By reason of the fact that the pivot connection 47 between the bars is near the upper ends of the bars, it will be seen that the mirror can be located relatively close to the forward sides of the standards when it is in the vertical position or in parallel relation with the standards or, in other words, the hinges reduce to a greater extent the amount which the mirror sets out from the top of the case than other types of mirror supporting hinges.

The hinge bar 31 is attached at its upper and lower ends respectively to the supporting standard 22 and the mirror bracket 26 by screws 48 while the upper and lower ends of the slotted bar 32 are attached respectively to the mirror bracket 26 and the standard 22 by screws 49. The heads of the screws 48 have light frictional engagement with the ends of the bar 31 through which they extend so that the bar may turn on the screws and the screws 49 are also lightly engaged between the heads thereof and the bar 32 so that this bar may slide on the shanks of the screws.

When the mirror is in vertical position as shown in Figs. 2 and 5, the shanks of the screws will pass through their respective slots approximately midway between the ends of the slots.

When the lower end of the mirror is pulled forwardly so as to tip the mirror back the outward swinging of the lower ends of the apertured hinge bars 31 effects the shifting of the slotted bar 32 on the shanks of the screws 49 and the tilting of the mirror is checked only by the engagement of the screw shanks in the remote ends of the slots.

It will be apparent from the foregoing description and particularly upon reference to Figs. 8 and 9, that the hinge consists essentially of two bars pivotally joined together. Also it will be apparent from these views that these two bars, being pivotally connected at approximately the upper third portion thereof and being longitudinally curved so that the concave edges are opposed, substantially conforms to a tong construction and in addition to this longitudinal curvature with the compound transverse curvatures of the lower portions of the bars, that is the portions below the transverse pivot connection provided by the pin 47, the lower ends or terminals 34 and 41 are so disposed that such terminal of one bar will be disposed in the plane of the upper end portion of the other bar. This arrangement is clearly brought out in Fig. 9.

In the foregoing description the bracket referred to and through the medium of which the hinge bars are connected with the back of the side frame of the mirror has been shown and described as being in the form of a solid block of wood or similar suitable material. If desired, this bracket may also be formed from a section of angle iron as illustrated in Figs. 3 and 4 where such bracket is generally designated 26a. In using this type of bracket it will be seen that one leg of the angle, here designated 26b, will be secured flat against the back face of the vertical side portion of the frame 14 so as to have the other leg, here designated 26c, project rearwardly from the frame adjacent to the inner side of the frame portion to which it is attached so as to lie in closely spaced parallel relation with the outer side of the adjacent standard 22. The manner of mounting the hinge between the bracket leg 26c and the adjacent standard 22 will, of course, be readily apparent from the preceding description of the manner in which the hinge is mounted between and attached to the bracket 26 and the outer side of the adjacent standard 22. Therefore, it is not believed that further description of this mounting is required.

In place of standards of wood, such as are shown in Figs. 1 to 4 and designated 22, use may be made of steel standards such as are shown in Figs. 11 to 13. Such steel standards are in these figures designated generally by the reference character 50 and these may be used in association with steel angle bar brackets such as hereabove described but which in these last mentioned figures are generally designated 51.

The steel or metal standards 50 may, of course, be of any desired character or of any desired cross sectional design. The standards here shown are in the form of tubular members or channel bars in which the back portion is designated 51ª with the side webs 52, each of which carries the narrow inturned flange 53. As will be readily seen upon reference to Fig. 13, the angle iron bracket 51 has one leg 54 secured to the back of the mirror frame while the other leg 55 extends rearwardly therefrom and bolts 56 and 57 respectively couple the slotted upper end of the hinge bar 32 and the apertured lower end of the hinge bar 31 with the rearwardly extending leg 55 of the angle iron bracket while the bolts 58 and 59 respectively attach the upper end of the hinge bar 31 and the slotted lower end of the hinge bar 32 to the outer side web 52 of the adjacent channel standard 50.

It will be seen from the foregoing that the functioning of the hinge connected between each side portion of mirror frame 14 and the adjacent standard 50 is exactly the same as described in connection with the mountings in the preceding figures employing either the combination of angle iron bracket and wood standard or wood block bracket and wood standard.

The lower ends of the metal standards may be secured in any suitable manner to the back of the case 16, the manner of attaching the standards being here shown as the same as the mountings disclosed in application Serial No. 652,002, filed April 10, 1957, where a straddle clamp 60 is secured to the back of the case and a nut and bolt assembly, generally designated 61, adjustably secures the standard in the straddle clamp in the manner shown.

From the foregoing it will be apparent that there is provided in the present hinge structure a simple, strong and durable construction employing a minimum of parts, actually three only, exclusive of the mounting screws and bolts, which three parts, of course, comprise the two bars and the pivot pin or rivet 47. Also it will be seen that by reason of the unique manner in which the two bars are formed and pivotally coupled together, they function, as previously stated, in the nature of tongs so that the mirror is supported so as to set back close to the back of the case, thereby providing for use of the major portion or a maximum of the top surface of the case top 18 while at the same time, due to the unique construction and manner of connecting the bars of the hinges to the standards and the mirror, the latter can be very easily and smoothly adjusted from a vertical position to a forward tilting or rearward tilting position, which position it will maintain without danger of it swinging back to its starting upright or vertical position.

I claim:

1. A hinge mounting for a framed body such for example as a mirror designed to be suspended by and between two upright supports, said mounting in combination with such body and supports consisting of a pair of elongate bars crossed in simulation of a pair of tongs with a transverse pivot connection therebetween, means whereby upper and lower ends of one bar may be respectively coupled for pivotal turning only on axes paralleling the axis of said transverse pivot connection with a standard and an adjacent side of a mirror frame, and means whereby upper and lower ends of the other bar may be respectively coupled for pivotal turning on axes paralleling the axis of said transverse pivot connection with said adjacent side of the mirror and the adjacent standard and also for limited longitudinal movement across the last stated pivot axis relative to said adjacent side of the mirror and the said adjacent standard.

2. A hinge mounting according to claim 1, wherein said bars in a portion of each below the said transverse pivot connection are formed for lateral cross-over relationship one with the other whereby the said portion of each bar is located approximately in the plane of that portion of the other bar which is above the said transverse pivot connection.

3. A hinge mounting according to claim 1, wherein each of said bars in the portion thereof below the said transverse pivot connection is longitudinally curved in a direction such that said portions have the lower ends directed approximately toward one another in the manner of tongs and said portions below said transverse pivot connection further being formed for lateral cross-over relationship one with the other whereby the said portion of each bar is located approximately in the plane of that portion of the other bar which is above the said transverse pivot connection.

4. A hinge mounting according to claim 2, wherein the said transverse pivot connection is located a substantial distance above the transverse centers of the bars whereby in the upright body supporting position of the hinge mounting approximately two-thirds of the bars' lengths hang below said pivot connection.

5. A hinge structure of the character described comprising two bar members each having with respect to the upright operative position of the structure a long straight upper portion and a short straight lower portion connected to the upper portion by a curved intermediate portion, the curvature of the intermediate portion being in the longitudinal direction of the bar, said upper portions being in crossed relation and having a pivot connection therebetween and the bars being arranged with the concave sides of curved portions opposed, said curved portions further having a transverse compound curvature whereby the curved intermediate portions have a crossed-over relation positioning the straight lower portion of each bar in the plane of the upper portion of the other bar, one of said bars having a circular aperture in each end and the other bar having a longitudinally extending elongated aperture in each end thereof.

References Cited in the file of this patent
UNITED STATES PATENTS

| | | |
|---|---|---|
| 1,552,723 | Mielenz | Sept. 8, 1925 |
| 1,864,164 | Aldeen | June 21, 1932 |